No. 843,784. PATENTED FEB. 12, 1907.
M. P. ZINDORF.
MACHINE FOR LEVELING AND SCRAPING.
APPLICATION FILED JUNE 8, 1906.
2 SHEETS—SHEET 2.
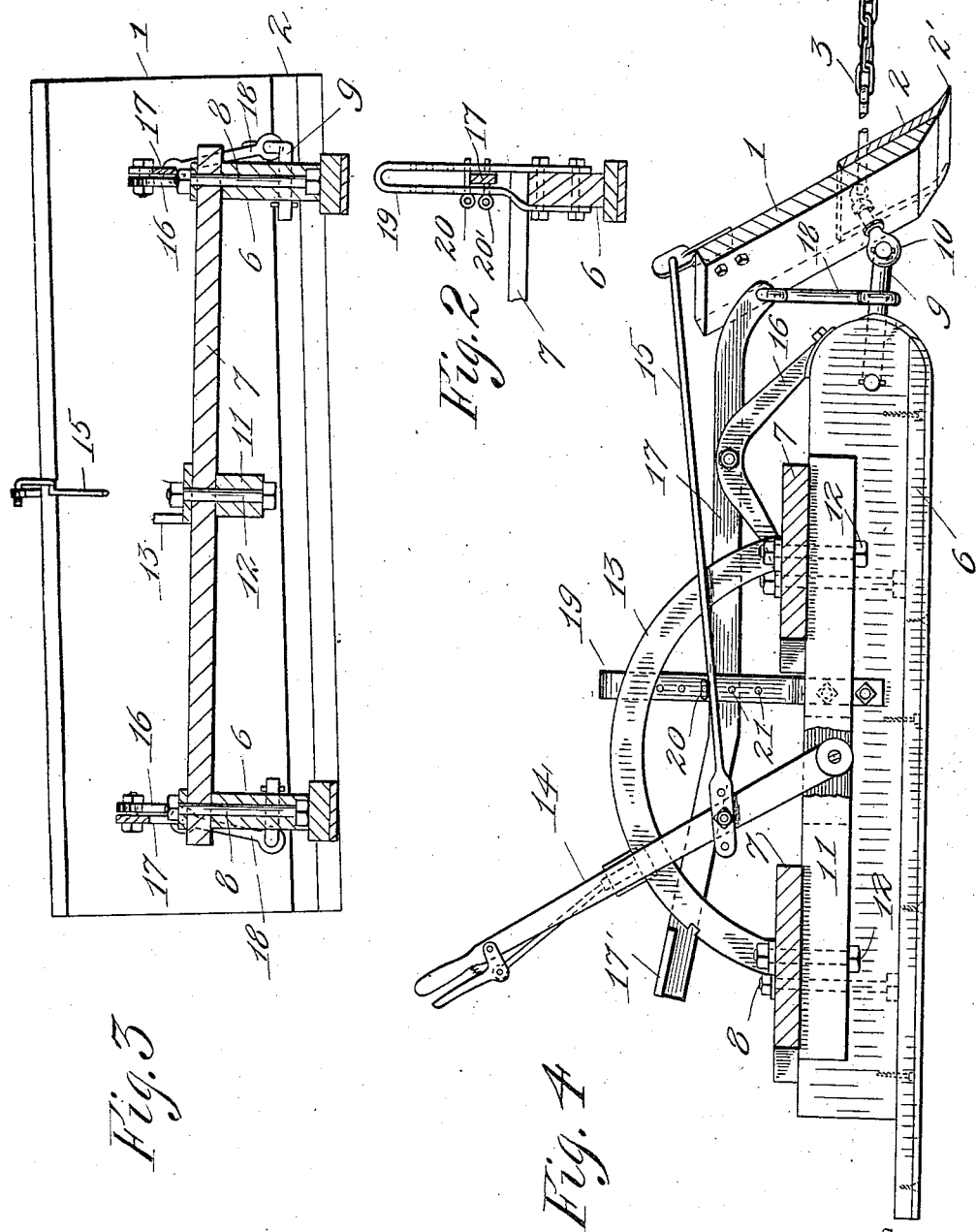
Witnesses
Edward W. Cressman.
Arlita Adams
Inventor
M. P. Zindorf
By
Adams & Brooks
Attorneys

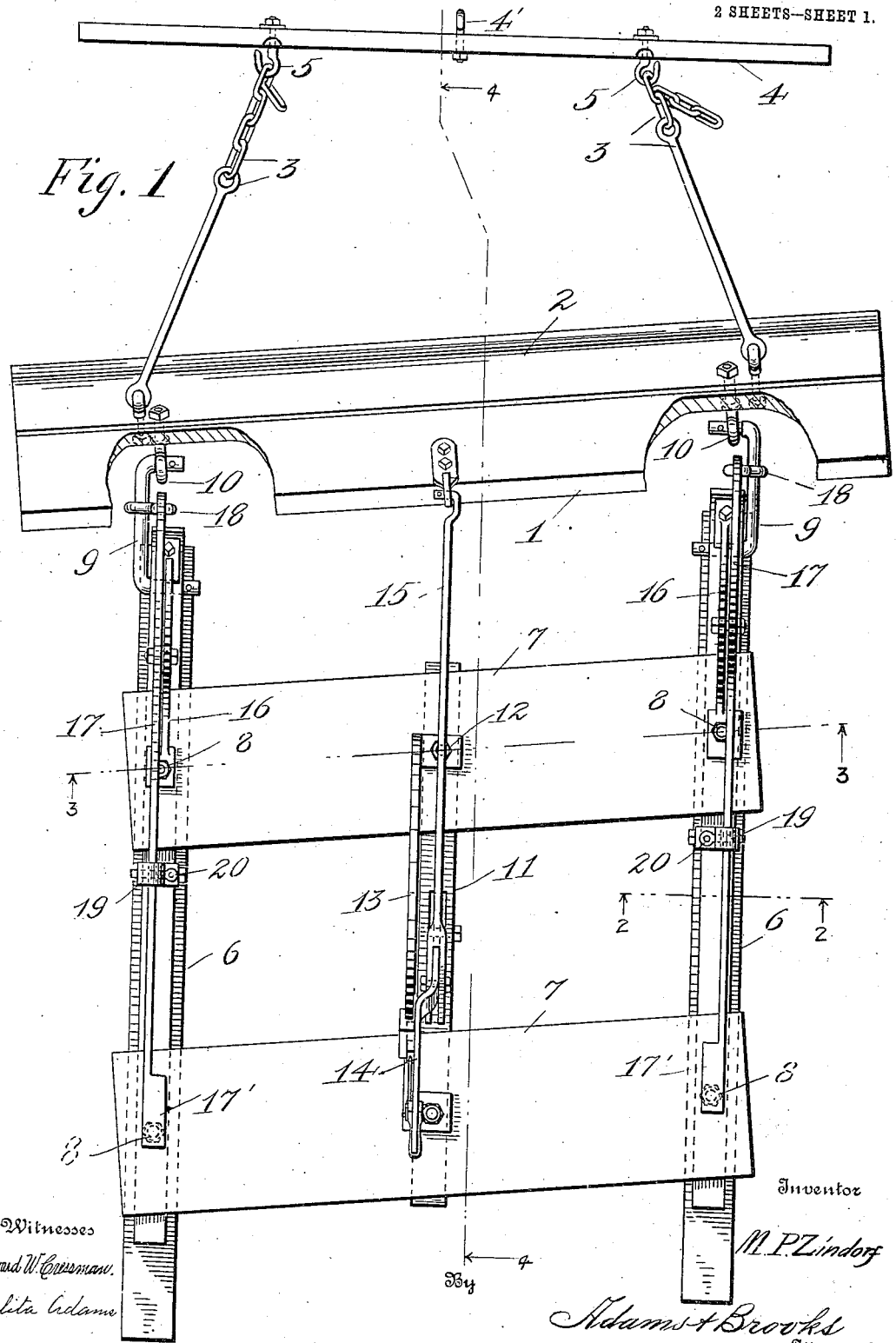

UNITED STATES PATENT OFFICE.

MATTHIAS P. ZINDORF, OF EVERETT, WASHINGTON.

MACHINE FOR LEVELING AND SCRAPING.

No. 843,784.  Specification of Letters Patent.  Patented Feb. 12, 1907.

Application filed June 8, 1906. Serial No. 320,912.

*To all whom it may concern:*

Be it known that I, MATTHIAS P. ZINDORF, a citizen of the United States of America, and a resident of the city of Everett, in the county of Snohomish and State of Washington, have invented certain new and useful Improvements in Machines for Leveling and Scraping, of which the following is a specification.

My invention has for its primary object the provision of an improved machine which will operate in an efficient manner in grading and leveling uneven surfaces.

A further object is to provide a scraper which can be readily adjusted diagonally of its line of movement and improved means for supporting the scraper for such adjustment.

With the above and other objects in view, to be set forth as the description progresses, the invention resides in the construction, arrangement, and combinations of parts hereinafter described, and succinctly defined in the appended claims.

In the accompanying drawings, in which like numerals of reference indicate like parts throughout the several views, Figure 1 is a plan view of land-grader constructed in accordance with my invention with parts broken away, the scraper being disposed diagonally of its path of travel. Fig. 2 is a fragmentary sectional view on line 2 2 of Fig. 1. Fig. 3 is a section taken on line 3 3 of Fig. 1 and showing one end of the scraper elevated, and Fig. 4 is a section taken on line 4 4 of Fig. 1.

Reference-numeral 1 indicates the scraper, shown as being of elongated form and consisting of a board provided at its lower portion with a metal plate 2, whose lower portion is shaped to provide a scraping or cutting edge 2', and connected with this scraper are suitable independently-adjustable flexible connections 3, formed partly of lengths of chain. At their outer portions connections 3 are connected to a draft-bar 4, through the medium of hooks 5, from which they can be readily disengaged when it is desired to adjust them by "taking up" or "letting out" one or more of their links, as is obvious.

The draft power is applied to draft-bar 4 by suitable connections, (not shown,) made with hook 4', and when one of the connections 3 is shortened power applied to move the scraper for scraping will first obviously swing the scraper to a diagonal position relatively to its line of movement, as clearly shown in Fig. 1, and the scraper being drawn in this set position will discharge the collected material from its rear end to one side of its path. The scraper can be set in a reverse diagonal position from that shown in Fig. 1 by making its other connection 3 the shorter.

The means for supporting the scraper consists of suitable bearing members 6 in the form of runners, which may be shod, as shown, and cross members 7, to which said runners are pivoted, as by bolts 8.

Reference-numeral 9 indicates links having inturned end portions loosely engaged in eyebolts 10, secured to the scraper, and in suitable openings provided in the runners. The inturned end portions of the links having loose engagement in their respective mountings allows for the required play incident to the raising of but one end of the scraper, as will be more clearly set forth hereinafter.

Reference-numeral 11 indicates a support pivoted to the cross members 7 by bolts, as 12, which bolts also pivotally connected a notched segment 13, and a lever 14, having a latch for engagement in the notch of said segment, is pivoted to said support. This lever is connected by a link 15 to the scraper, and when operated the scraper is swung on the outer inturned ends of links 9 and its pitch or slope thereby changed.

The means for raising either or both ends of the scraper from the ground as now considered consists of independent mechanisms mounted on the scraper-supporting means at the opposite sides thereof, and as both are identical in construction a description of one is deemed sufficient for a clear understanding of both. This consists of a suitable stand 16, secured at its forward end to the underlying runner and having its rear end pivotally secured by the forward pivot-bolt 8, a lever 17 fulcrumed on said stand and having a link 18 connected with its forward end and with the adjacent link 9. This lever is intended to be foot-operated and is therefore provided at its rear portion with a broadened portion 17' for engagement with the foot of the operator. Lever 17 projects through an upright 19, secured to the runner, and suitable means is provided in this upright for holding the rear end portion of lever 17 lowered after it has been depressed to raise one end of the scraper, as shown in Fig. 3, the same consisting of a removable pin 20, which is arranged above the lever, so that while preventing upward movement thereof said lever will be free to be lowered to effect further elevation of the scraper. Each side piece of the upright is provided with a plurality of apertures 21, in any one of which pin 20 can be inserted for securing the lever at different adjustments, whereby the scraper can be held at various elevations from the ground.

If desired, means can be provided for securing the scraper against both raising and lowering movements, such means as now considered consisting of a pin 20', (see Fig. 2,) which passes through opposite apertures 21 and through a suitable opening provided in lever 17.

By the construction of the supporting means for the scraper, the cross members 7 having pivotal connections with the runners, the latter may be adjusted relatively to each other in the direction of the line of movement of the machine to support the scraper when it is brought to a diagonal position, as heretofore set forth. Further, it will be observed that the respective mechanisms for shifting the scraper vertically and through vertical planes are so mounted that their relative positions will be unchanged by any adjustment of the bearing members.

Having thus described my invention, what I claim as new, and desire to secure by Letters Patent of the United States of America, is—

1. In a machine of the type set forth, spaced-apart runners connected for independent lengthwise adjustment, and a scraper supported by said runners.

2. In a machine of the type set forth, spaced-apart runners pivotally connected, whereby they can be independently advanced, a scraper arranged in advance of said runners and supported thereby, and means to hold said runners in their adjusted positions.

3. In a machine of the type set forth, spaced-apart runners means extending between the runners to which said runners are pivoted, and a scraper pivotally supported by said runners, for the purpose specified.

4. In a machine of the type set forth, spaced-apart runners, means to which said runners are pivoted, a scraper supported by said runners, and means for tilting said scraper rearwardly including a member pivotally supported on said first means.

5. In a machine of the type set forth, a supporting means, runners pivoted thereto, a scraper, flexible connections between said scraper and the runners, and independent mechanisms for raising the respective ends of said scraper.

6. In a machine of the type set forth, a scraper, means to support said scraper, link connections between said means and scraper connected so as to allow independent raising of the respective ends of the scraper, and independent means for raising said scraper each connected to one of said link connections, for the purpose specified.

7. In a machine of the type set forth, spaced-apart runners, a means to which said runners are pivoted, a scraper connected to said runners for tilting movement, a support pivoted to said means, and means for tilting said scraper including a lever pivoted to said support.

Signed at Seattle, Washington, this 9th day of May, 1906.

MATTHIAS P. ZINDORF.

Witnesses:
   STEPHEN A. BROOKS,
   ARLITA ADAMS.